(12) United States Patent
Gierling et al.

(10) Patent No.: US 7,972,244 B2
(45) Date of Patent: Jul. 5, 2011

(54) METHOD FOR CONTROLLING THE TRANSMISSION OF A VEHICLE

(75) Inventors: Armin Gierling, Langenargen (DE); Friedemann Jauch, Tettnang (DE); Franz-Josef Schuler, Kressbronn (DE); Michael Kiefer, Tettnang (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 736 days.

(21) Appl. No.: 11/913,982

(22) PCT Filed: Apr. 26, 2006

(86) PCT No.: PCT/EP2006/003863
§ 371 (c)(1),
(2), (4) Date: Apr. 29, 2008

(87) PCT Pub. No.: WO2006/119868
PCT Pub. Date: Nov. 16, 2006

(65) Prior Publication Data
US 2008/0305927 A1 Dec. 11, 2008

(30) Foreign Application Priority Data
May 10, 2005 (DE) .................. 10 2005 022 314

(51) Int. Cl.
*F16H 61/26* (2006.01)
(52) U.S. Cl. ............. 477/127; 477/97; 477/130; 701/62
(58) Field of Classification Search .................. 477/97, 477/115, 121, 127, 130, 156; 701/51, 62
See application file for complete search history.

(56) References Cited

U.S. PATENT DOCUMENTS

| | | | |
|---|---|---|---|
| 4,996,893 A | | 3/1991 | Nakamura et al. |
| 5,043,894 A | * | 8/1991 | Yamaguchi .................. 701/56 |
| 5,514,051 A | * | 5/1996 | Heid et al. .................. 477/120 |
| 5,605,519 A | | 2/1997 | Seidel et al. |
| 5,748,472 A | | 5/1998 | Gruhle et al. |
| 6,527,672 B1 | | 3/2003 | Henneken et al. |
| 6,592,493 B2 | | 7/2003 | Loeffler et al. |
| 7,204,784 B2 | * | 4/2007 | Suzuki et al. .................. 477/20 |
| 7,337,050 B2 | * | 2/2008 | Preisner .................. 701/51 |

FOREIGN PATENT DOCUMENTS

| | | |
|---|---|---|
| DE | 41 20 603 A1 | 1/1993 |
| DE | 43 12 717 A1 | 11/1993 |
| DE | 198 49 059 | 4/2000 |
| DE | 199 63 564 A1 | 7/2001 |
| DE | 101 38 723 A1 | 3/2002 |
| EP | 0 638 742 A1 | 2/1995 |
| EP | 1 342 939 A2 | 9/2003 |

* cited by examiner

*Primary Examiner* — Ha D. Ho
(74) *Attorney, Agent, or Firm* — Davis & Bujold, P.L.L.C.

(57) ABSTRACT

Described is a method for controlling a transmission for motor vehicles, especially an automatic transmission or an automatic gearbox, where a gear ratio ("1", "2", "3", "4", "5", "6") is adjusted according to operating conditions by means of pre-determined shifting programs ("0", "Eco", "Normal", "Sport", "Mountain II", "Warm-up", "Tip") and corresponding specific shifting values (HS45, RS43) and where in relation to a vehicle's actual operating condition at least one special function ("Curve Recognition KE", "Rapid Drive Pedal Release FO", "Spontaneous Delay Vehicle SVF", "Drive Speed Control FGR", "Drive Dynamic control ESP") is activated, which prevents the change from an actual gear ratio to a target gear ratio requested by a shifting program within a pre-determined operating range of a vehicle. In a first version of the method, the operating range, wherein a gear ratio change of the transmission is prevented, is changed in relation to applied specific values that depend on the operating condition. In a second version of the method it is planned that the shifting characteristics are changed in relation to applied specific values that depend on the operating condition in such a manner that the operating points of the vehicle that are defined on the side of the shift characteristics, for which gear ratio changes must be performed, are adjusted to the actual operating condition of the vehicle.

15 Claims, 9 Drawing Sheets

Fig. 4

Curve Recognition (KE) DF1

| Shifting Program | 0 | ... | Eco | Normal | Sport | ..... | Mountain II | Warmup | Inching |
|---|---|---|---|---|---|---|---|---|---|
| α = 100% | | | 0.5 | 0.7 | 0.8 | | 1 | 0.2 | 0 |
| α = 60% | | | 0.5 | 0.7 | 0.8 | | 1 | 0.2 | 0 |
| α = 40% | | | 0.45 | 0.6 | 0.6 | | 0.8 | 0.1 | 0 |
| α = 0% | | | 0.45 | 0.6 | 0.6 | | 0.8 | 0.1 | 0 | n_mot DF4

| HS | 1-2 | 2-3 | 3-4 | 4-5 | 5-6 |
|---|---|---|---|---|---|
| n_mot_max_st | | | | | |
| α = 100% | 0 | 0 | 4000 | 5000 | 6000 |
| α = 60% | | | | 4000 | |
| α = 40% | | | | 4000 | |
| α = 0% | | | | 3000 | |
| | | | | 3000 | |

Fig. 6

Curve Recognition (KE)

| Shifting Program | 0 | ... | Eco | Normal | Sport | ... | Mountain II | Warmup | Inching |
|---|---|---|---|---|---|---|---|---|---|
| α = 100% | | | 0 | 0 | 0 | | 0 | 0 | 0 |
| α = 30% | | | 0.1 | 0 | 0.4 | | 0.2 | 0.1 | 0 |
| α = 0% | | | 0.2 | 0 | 0.35 | | 0.5 | 0.1 | 0 |

Curve Recognition (KE)

| Shifting Program | 0 | ... | Eco | Normal | Sport | ... | Mountain II | Warmup | Inching |
|---|---|---|---|---|---|---|---|---|---|
| α = 100% | | | 0 | 0 | 0 | | 0 | 0 | 0 |
| α = 50% | | | -0.1 | 0 | -0.4 | | -0.2 | -0.1 | 0 |
| α = 30% | | | -0.2 | 0 | -0.35 | | -0.5 | -0.1 | 0 |
| α = 0% | | | -0.2 | | | | | | |

DF1

US 7,972,244 B2

METHOD FOR CONTROLLING THE TRANSMISSION OF A VEHICLE

This application is a national stage of PCT/EP2006/003863 filed Apr. 26, 2006 which claims priority from German Application Serial No. 10 2005 022 314.1 filed May 10, 2005.

FIELD OF THE INVENTION

The invention pertains to a method for controlling a transmission for motor vehicles, especially an automatic transmission or an automatic gearbox.

BACKGROUND OF THE INVENTION

Commonly known transmissions, such as automatic transmissions, automatic gearboxes, etc. are commonly designed with electronic transmission control devices which aid the transmissions in relation to various predetermined shift criteria during the operation of a vehicle with the adjustment of gear selections, which in turn are selected in relation to different drive behaviors that are stored in the transmission control devices, a driver type and/or in relation to a vehicle's actual operating condition.

The shift criteria includes, among others, so-called shift programs for the interpretation of various operational procedures, which are activated at least in relation to actual operational parameters of the vehicle and/or at least in relation to the driving behavior of a driver. In order to control a transmission in relation to a current driving situation, the transmission control devices provide a multitude of different shifting programs, such as a normal shifting program, a sport shifting program, an economical shifting program, a mountain shifting program, a warm-up shifting program, etc.

Additionally, so-called special functions are input into the electronic transmission control devices, which prevent the gear shifts of a transmission that are requested by the predetermined shifting programs. The special functions can therefore refer to a single as well as to multiple up-shift and down-shift operations.

In this it is disadvantageous, however, that the commonly known methods for controlling a transmission with special functions for an anti-shifting device is only, to a very limited degree suitable in adjusting a transmission to the current operating status of the vehicle at a level that will ensure a high driving comfort.

SUMMARY OF THE INVENTION

It is the purpose of the present invention to provide a method for controlling the transmission for motor vehicles, especially an automatic transmission or an automatic gearbox, which describes a dynamic and variable control system that is necessary to ensure a high driving comfort.

In both variants of the inventive method for controlling the transmission for motor vehicles, especially an automatic transmission or an automatic gearbox, gear ratios are adjusted, according to the operating conditions, by way of pre-determined shifting programs and corresponding shifting characteristics. In relation to an actual operating condition of a vehicle, at least one special function is activated, which prevents the change, which is requested by the shifting program, from a transmission's current gear ratio to a target gear ratio within a vehicle's pre-determined operating range.

According to the present invention, the operating range, wherein the transmission's gear ratio shift is prevented, is changed in the first version of the method in relation to characteristics that are applied to operational conditions, whereby contrary to the commonly known static transmission controls, a dynamic and variable control system is available.

The possibility is now available with simple means to increase, decrease and/or shift the operating range of a motor vehicle, which is preferably designed as a motor speed range of a drive motor of a motor vehicle, which is limited by a lower motor speed limit as well as an upper motor speed limit, so that an anti-shifting device that is activated through a special function can be adjusted according to necessity by simple means and respective adjustments to the various operating conditions of a motor vehicle.

In the second invention-related version of the method for controlling a transmission for motor vehicles, a dynamic and variable control system is created in that the shift characteristics of the shifting programs are changed depending on applied operating condition characteristics in such a manner that operating points of the vehicle, which are defined on the side of shift characteristics, for which the gear ratio shift is required, are adjusted to the actual operating condition of the motor vehicle.

Therefore in the second invention-related version of the method for controlling a transmission for motor vehicles contrary to the first version of the method, the respective shifting characteristic, upon which the control is based, is changed depending on applied operating condition characteristics in such a manner that a high level of driving comfort as well as a high level of driving safety is achieved due to gear ratio changes within the transmission.

BRIEF DESCRIPTION OF THE DRAWINGS

Additional advantages and preferred inventive embodiments are found in the patent claims as well as the embodiments that are described, in principal, with reference to the illustration, which is shown in:

FIG. 4 two data fields in table form, by which means a load-dependent dynamic up-shift prevention can be performed;

FIG. 6 a data field in table form, by which means a standard up-shift characteristic curve for the realization of a dynamic shifting point variation is variable depending on the operating condition;

FIG. 8 an additional data field, by which means a condition dependent, dynamic shifting point variation can be performed during a down-shift;

DETAILED DESCRIPTION OF THE INVENTION

Figure 1:
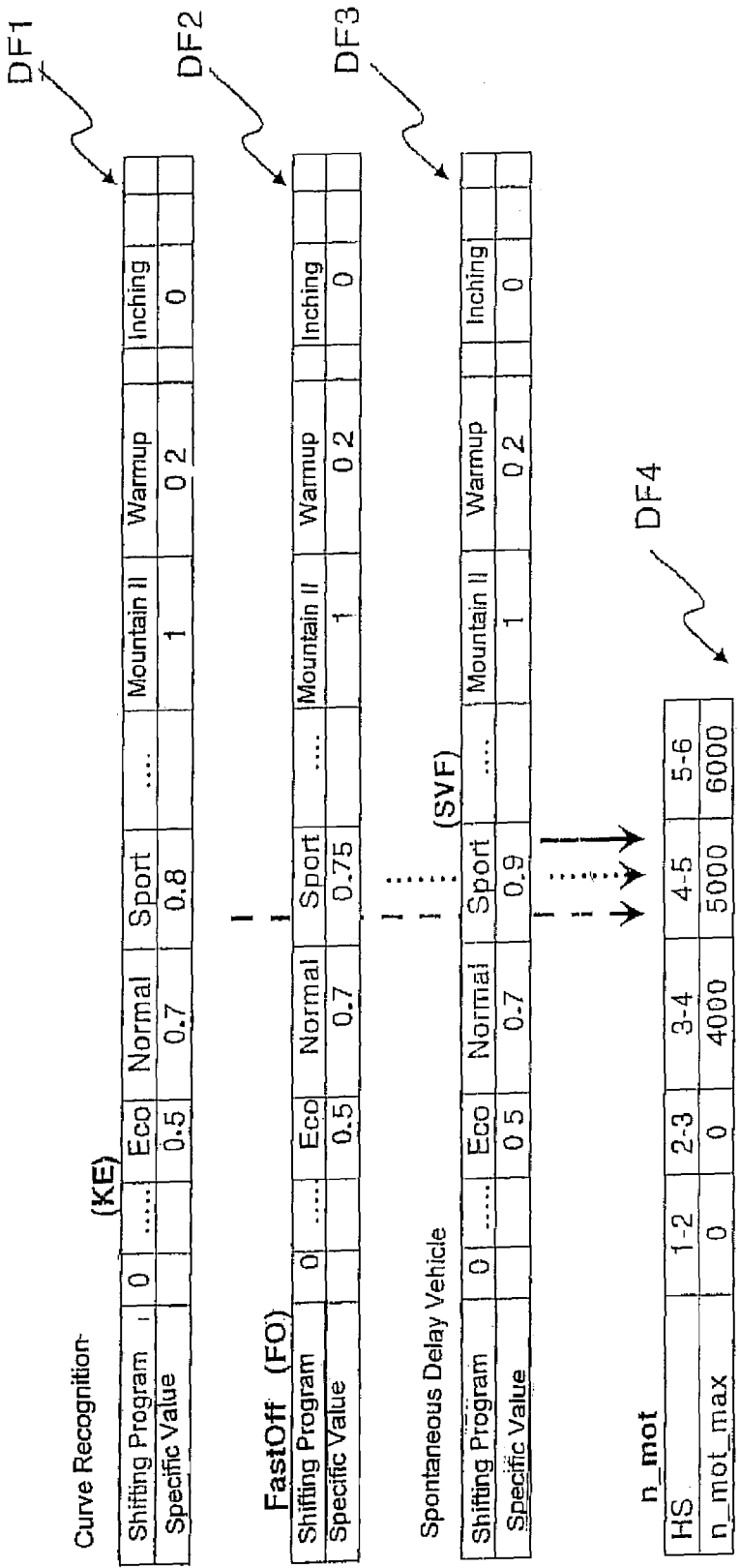
FIG. 1 several data fields, in table form, of different and at the same time special functions that can be activated to process a shift prevention in relation to operating conditions.
Figure 2:
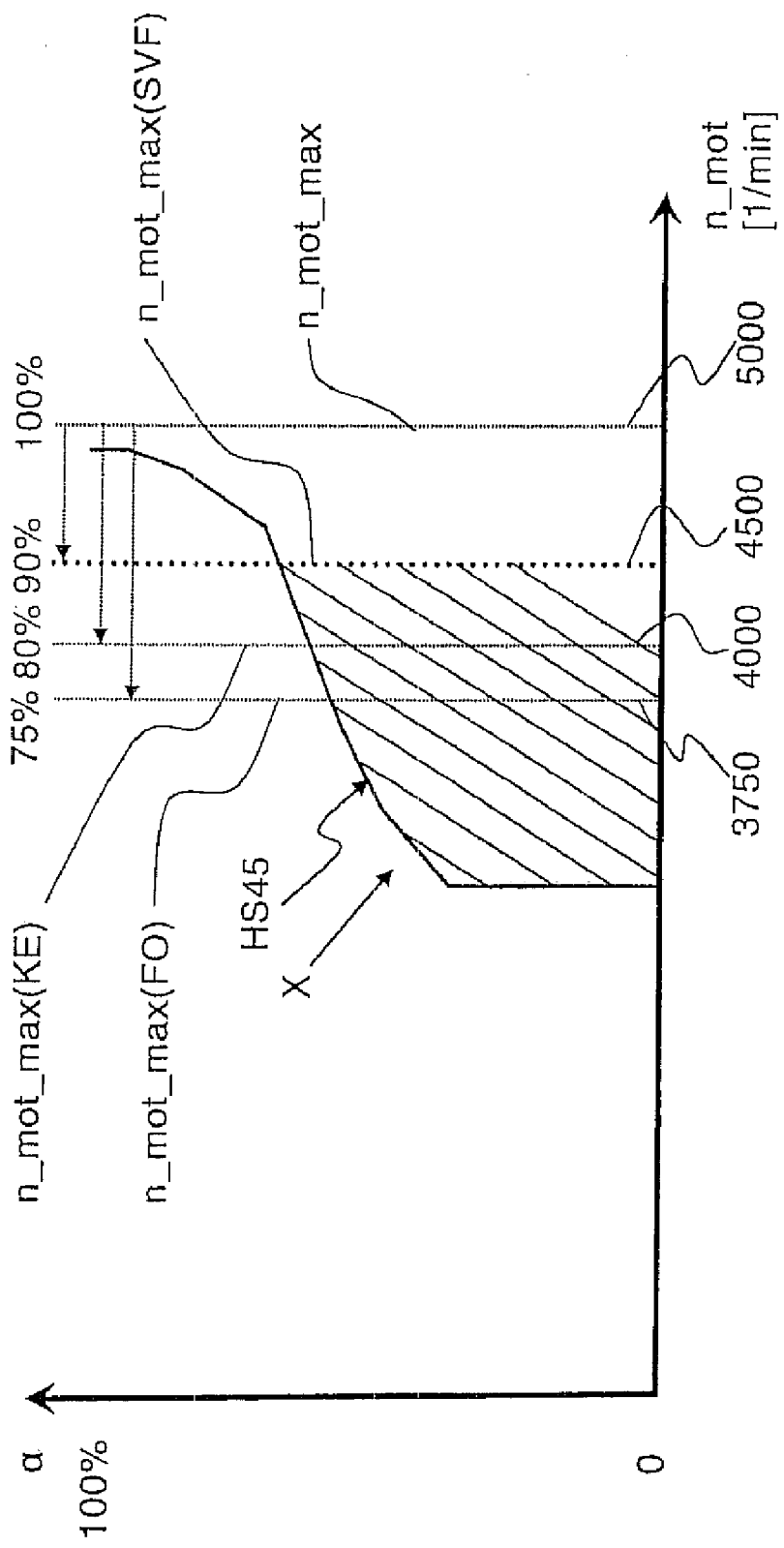
FIG. 2 an illustration of an up-shift characteristic curve of a sport shifting program with dynamic up-shift prevention that corresponds with FIG. 1.

Several data fields DF1 through DF4 are shown in table form in FIG. 1, which are used to perform a first version of the inventive method for controlling a transmission with six gear ratios "1" through "6" for the forward movement of a motor vehicle and which correspond with the illustration shown in FIG. 2.

The data fields DF1 through DF3 each represent special functions, which during special operating conditions in special operating ranges of the vehicle, i.e. in the embodiment based on FIG. 1 through FIG. 5 in a defined motor speed range of the engine speed n_mot of the engine of a vehicle, prevent a required up-shifting. In the data fields DF1 through DF3 of the special functions each of the shifting programs "0", "Eco", "Normal", "Sport", "Mountain II", "Warm-up", "Trip" as well as additional shifting programs are in the present case assigned to different condition dependent applied characteristics.

The shifting programs shown in the data fields DF1 through DF3 are in the present case selected by a selector lever or a control button to select for example a sport driving program or a winter driving program, depending on the driver's choice and the current driving situation and then supply the most appropriate gear ratio. The shifting program that is stored in the transmission control and is to be activated is for example determined by a table, which is not further specified, which then depending on pre-determined priorities recalls a function in the familiar manner, which provides the actual application for the necessary gear ratio. Additionally, for example the special functions "Curve Recognition KE", "Immediate Gas Pedal Return FO" and "Spontaneous Delay Vehicle SVF" are provided, which prevent a requested up- or down-shifting of either one gear ratio step or several gear ratio steps of the transmission when pre-determined operating conditions of the vehicle through pre-determined operating ranges are present. Additional special functions can of course be provided that enable an individual manipulation of the shifting points.

When a driver enters into a curve while his vehicle is in the fourth forward gear and reduces a drive pedal movement, a requested up-shifting is thus prevented through the special function "Curve Recognition KE" in an operating condition. The special function "Spontaneous Delay Vehicle SVF" assists during braking by means of early down-shifting and requests in such operating conditions also a shift prevention so that the additional braking action of the motor braking torque is not lost due to an up-shifting within the transmission.

In data field DF4 different up-shifts HS, such as from the first forward gear "1" toward the second forward gear "2", are each assigned to one upper motor speed limit n_mot_max of the motor speed n_mot for the definition of a pre-determined operating range, wherein a gear ratio change within the transmission is to be prevented by the activated special functions "Curve Recognition KE", "Rapid Drive Pedal Release FO", "Spontaneous Delay Vehicle SVF". In this the upper motor limit n_mot_max at a limit of 5000 1/min is for example assigned to an up-shift that is based on a fourth forward gear "4" into a fifth forward gear "5". A lower motor speed n_mot_ min of the operating ranges and/or motor speed ranges of the motor speed n_mot pre-determined in data field DF4 is zero and can, depending on the individually existing application, be assigned to another appropriate motor speed value that is different from the first.

Other logical special functions, where an up-shift prevention can be requested and that can respectively be entered into the data field DF4, are for example: "Shift Program Change", "Downhill Recognition", "Drive Dynamic control ESP", "Manual Gear Selection (=inching–Operation)", "Drive Speed Control FGR (=Cruise Control Operations)", "Spontaneous Down-Shift due to Rapid Drive Pedal Activation" and "Double or Multiple Down-Shift".

In the following, a first version of the method according to the present invention is described by means of the FIG. 2 illustration of an up-shift characteristic curve HS45 for an up-shift HS originating from the fourth forward gear "4" toward the fifth forward gear "5", whose path is shown above the motor speed n_mot and in relation to a drive pedal position ∝.

The transmission control generally requests an up-shift HS from the fourth into the fifth forward gear in a familiar manner during the operating performance of the vehicle, while the up-shift characteristic curve HS45 is intersected in the direction marked by the arrow "X" if none of the special functions is activated for a shift prevention "Curve Recognition KE", "Rapid Drive Pedal Release FO", "Spontaneous Delay Vehicle SVF".

In familiar control systems, an up-shift is prevented by an activated special function for shift prevention through the entire operating performance of a vehicle as long as it is active. In the versions of the invention-based method, which are the basis for the illustrations according to FIG. 1 and FIG. 2, the operating range of the vehicle, i.e. in the present case the motor speed range of the motor speed n_mot, where an up-shift is prevented, in relation to the individually activated shift program and in relation to the individually activated special function, is changed according to the operating condition in such a manner that a motor speed value, which is deposited in the data field DF4 and each assigned to an up-shift HS, of the upper motor speed n_mot_max of the operating range of the vehicle is multiplied with a specific value, which has been deposited for the respective active shifting program in one of the data fields DF1 and/or DF3 of the special functions "Curve Recognition KE", "Rapid Drive Pedal Release FO", "Spontaneous Delay Vehicle SVF".

The changing of the upper motor speed n_mot_max of the operating range of the vehicle is graphically shown in FIG. 2 and illustrated by four vertical lines n_mot_max, n_mot_max (KE), n_mot_max (FO), n_mot_max (SVF), which are also more closely identified with the percentage values 75, 80 and 100. In this, the vertical line n_mot_max that is shown with 100% is equal to the in the data field DF4 deposited upper motor speed for the up-shift from the fourth into the fifth forward gear at 5000 1/min.

The vertical line n_mot_max (SVF) marked 90% is the result of the multiplication of the specific value that is assigned in the data field DF3 to the sport driving program "Sport", which has the value 0.9, and the upper motor speed n_mot_max that is deposited in the data field DF4 for the sport driving program "Sport". The vertical lines n_mot_max (KE) and n_mot_max (FO) marked 80% and 75% are each the result of the multiplication of the upper motor speed n_mot_max, that is deposited in the data field DF4 for the sport driving program "Sport", with the specific values that are assigned in the data fields DF1 and DF2 to the sport driving program "Sport" with the values of 0.8 and 0.75.

If only one of the special functions "Curve Recognition KE", "Rapid Drive Pedal Release FO f" or "Spontaneous Delay Vehicle SVF" is active, an up-shift which is requested when the up-shift characteristic curve HS45 is exceeded is performed when the upper motor speed is exceeded, which is pre-determined by the special function that is activated respectively. That means that an up-shift HS during activated special function "Rapid Drive Pedal Release FO" is performed at a lower motor value of the motor speed n_mot as is the case when the special function "Spontaneous Delay Vehicle SVF" is activated.

Additionally, in a vehicle's operating condition when several special functions are activated simultaneously, it is intended that a so-called maximum selection is performed between the specific values that are each assigned to the special functions. For example, the upper motor speed that is deposited in data field DF4 is therefore multiplied with the value 0.9 during activation of the sport driving program when all three special functions listed in FIG. 1 are activated at the same time, while the motor speed range, wherein an up-shift is then prevented, is marked in FIG. 2 by means of a shaded area.

It must be emphasized at this point that, depending on the individual applications, it is up to the expert to implement additional special functions with the invention-related procedures in order to be able to operate the transmission in agreement with the invention-related method and to the individually-desired extent adjusted to the actual operating condition.

Figure 3:
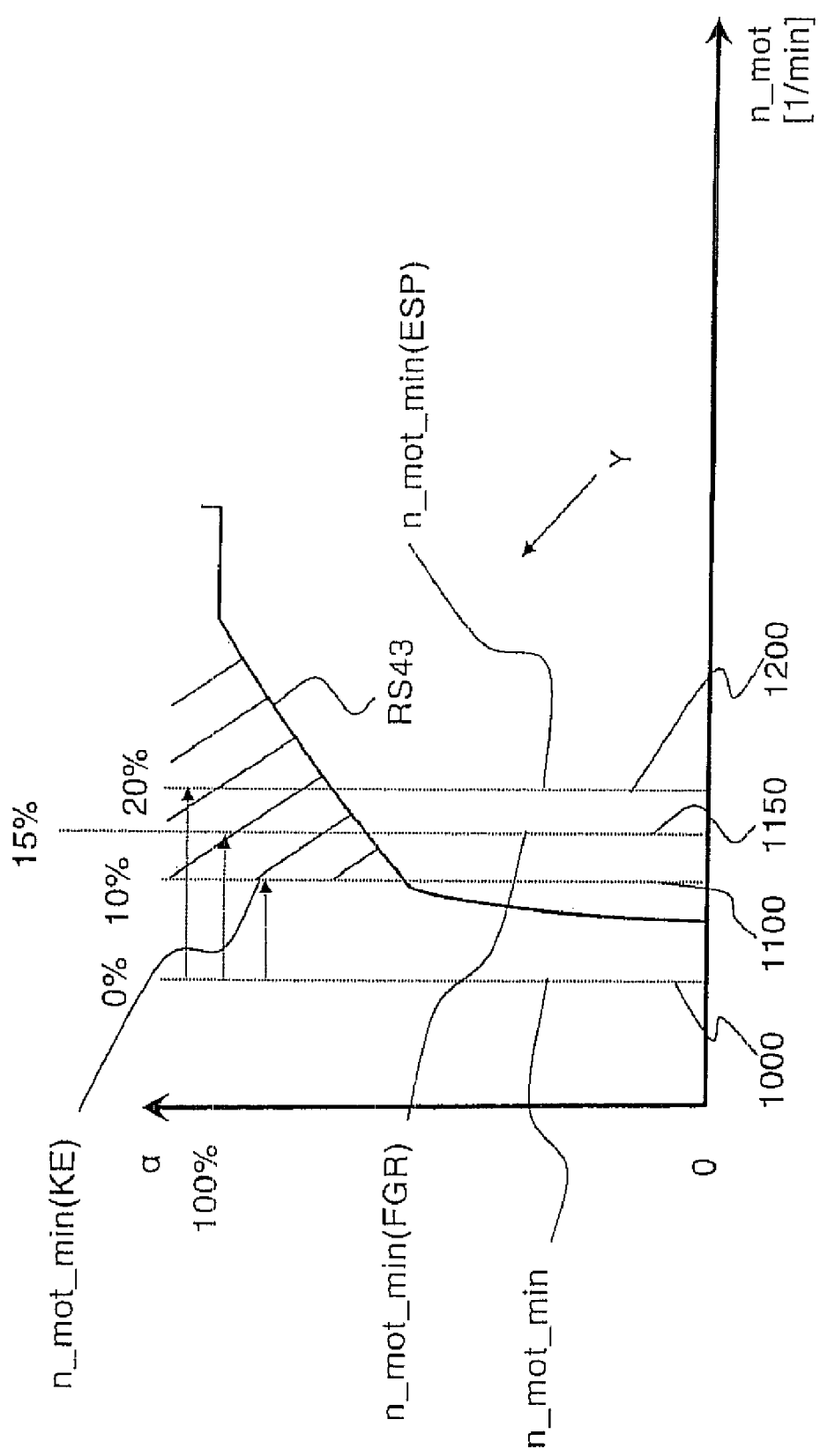
FIG. 3 an illustration of a down-shift characteristic curve with dynamic down-shift prevention that corresponds with FIG. 2.

FIG. 3 illustrates, similarly to FIG. 2 a down-shift characteristic curve RS43 originating from the fourth forward gear "4" toward a third forward gear "3" through the motor speed n_mot in relation to a drive pedal position ∝, where the operating range of the vehicle, where the gear ratio change of the transmission is being prevented, is in the present case limited by a lower motor speed n_mot_min at a value of 1000 1/min. The upper motor speed of the operating range is in the present case preferably not specified and can be at any value so that the operating range and/or the motor speed range of the motor speed n_mot, where the down-shift is being prevented, is not limited by an upper motor speed range.

For the down-shift characteristic curve RS43 illustrated in FIG. 3 and the related down-shift in the transmission, the data fields of the typical special functions "Curve Recognition KE", "Drive Speed Control FGR" and "Drive Dynamic Control ESP", which are further described in the same manner as in FIG. 1 and FIG. 2 but not further exemplified in the illustration, are provided for a shift prevention as well as at least another data field, which serves to assign the various down-shifts within the transmission to various lower motor speeds n_mot_min. Through the data fields of the special functions for a shift prevention, the individual drive programs are each assigned a specific value related to an operating condition that is individually determined, which serves to adjust the lower motor speed n_mot_min at 1000 1/min as exemplified in FIG. 3 for the various special functions for a down-shift prevention according to the operating condition, so that a dynamic system is available. Additional logical special functions, from which down-shift preventions can be requested and which can be programmed in a respective data field, are for example "Shift Program Change" and "Manual Gear Selection (inching Operation)".

In the present case, the down-shift from the third into the fourth forward gear is assigned to a lower motor speed n_mot_ min with a value of 1000 1/min, which is graphically represented in FIG. 3 by means of the vertical line n_mot_min.

The additional three vertical lines n_mot_max, n_mot_min (KE), n_mot_min (FGR), n_mot_min (ESP), which have been more closely marked with 10%, 15% and 20%, are the result of a process similar to the process described in FIG. 1 and FIG. 2, where the lower motor speed n_mot_min is multiplied with the specific values assigned to the shifting programs of the transmission through the special functions "Curve Recognition KE", "Drive Speed Control FGR" and "Drive Dynamic control ESP" and is thereby adjusted. This means that the operating range and/or the motor speed range, where the down-shifting that is requested by the individually activated special function, is adjusted by the various lower motor speeds n_mot_min (ESP) and the down-shifting is already performed when the relevant motor speed falls below its lower limit.

If several special functions are activated simultaneously, a mathematical minimal value selection is performed regarding the specific values input, for the shifting programs, in the special functions. With reference to the case illustrated in FIG. 3, where all three previously mentioned special functions are simultaneously active and where the smallest specific value assigned to the activated shift program at hand is 10%, the lower motor speed n_mot_min with a value of 1100 1/min is selected.

Figure 5:
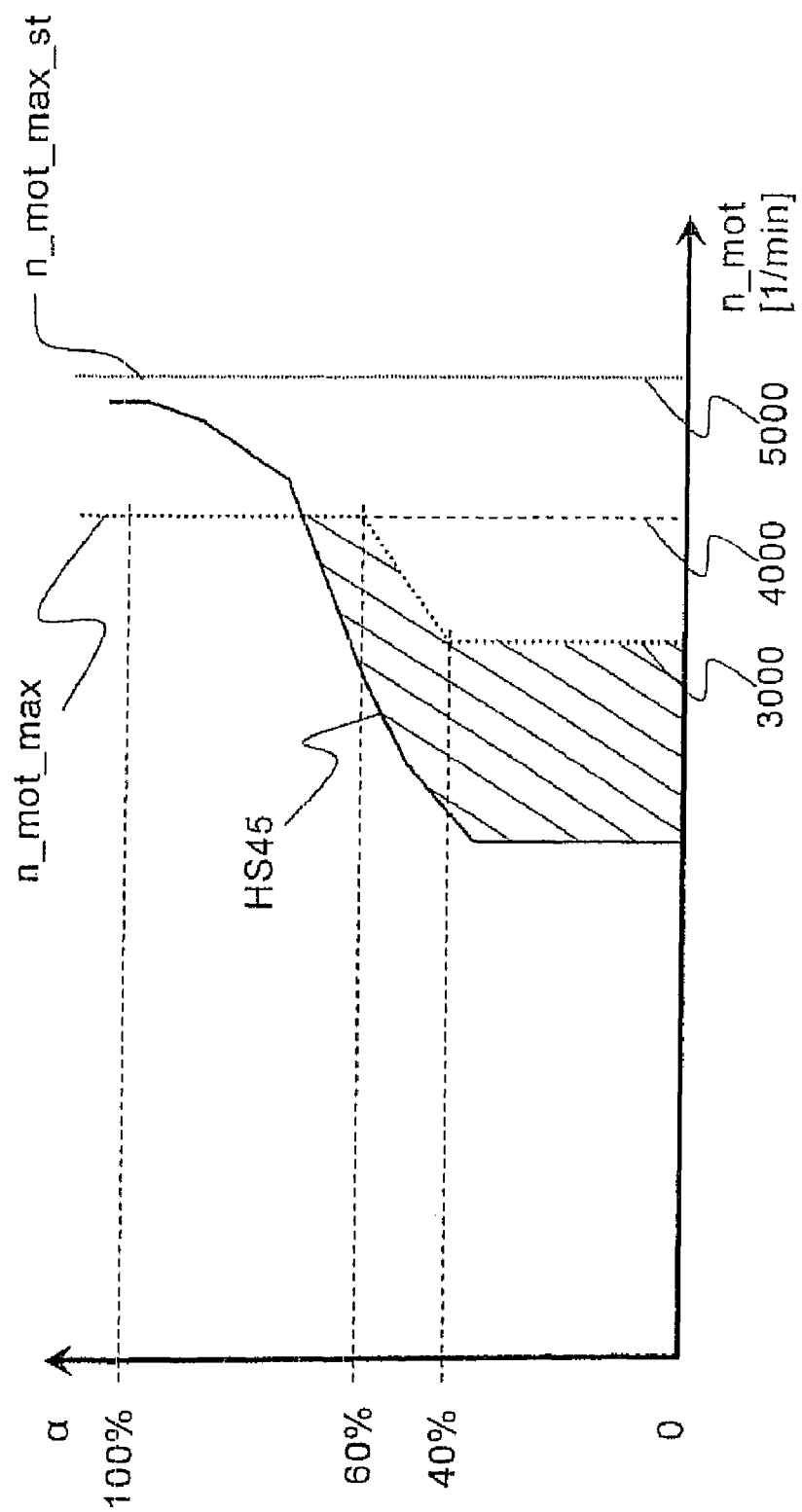
FIG. 5 an illustration of an up-shift characteristic curve of a sport shifting program with load dependent dynamic up-shift prevention that corresponds with FIG. 4.

FIG. 4 shows the data fields DF1 and DF4 illustrated in FIG. 1 in a developed embodiment for an up-shift HS originating from a fourth forward gear "4" toward a fifth forward gear "5", where the upper motor speed n_mot_max of the operating range of the vehicle, where a shift is prevented, varies through an operating range ∝ of the drive pedal in a manner illustrated in FIG. 5.

The load dependent version of the upper motor speed n_mot_max takes place either with several specific values, which have each been input for a shifting program in data field DF1, that are multiplied with a standard upper motor speed n_mot_max, for which a value of 5000 1/min is input in data field DF4 for the aforementioned up-shift, or by means of load dependent upper motor speed n_mot_max (α=100%) up to n_mot_max (α=0%) that are input in data field DF4, which are multiplied with a non-load dependent specific value of the data field DF1.

FIG. 6 shows the data field DF1 of the special function "Curve Recognition KE", which is used in another version of the method according to the present invention, where a shift prevention that is requested by an activated special function in form of a relative shifting point movement is applied. In this, only one active shifting characteristic is altered at a time in a manner described below to illustrate a defined operating condition progress.

Figure 7:
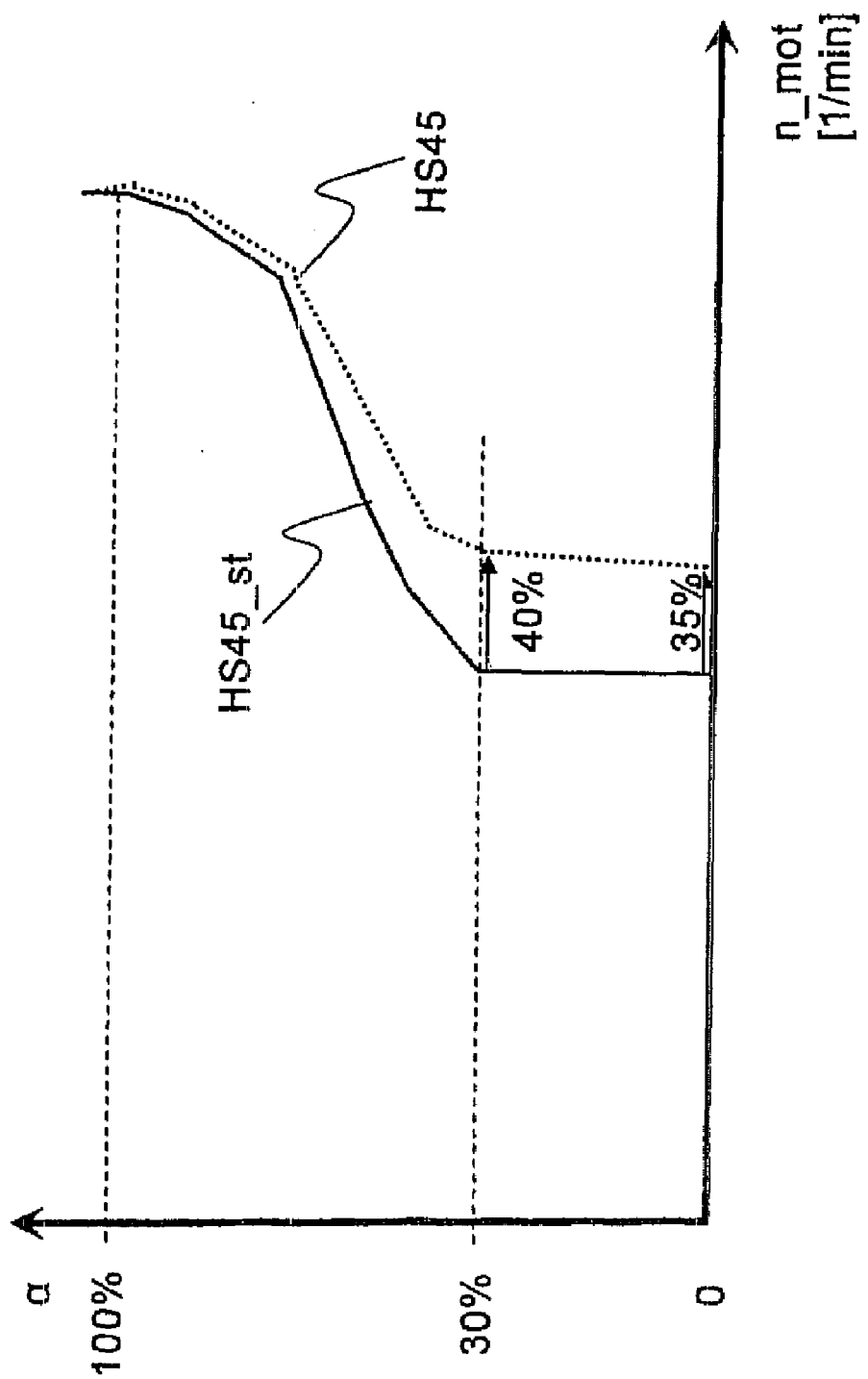
FIG. 7 a graphic illustration of adjusting an operating condition dependent, dynamic up-shift characteristic curve of a sport shifting program that corresponds with FIG. 6.

In the data field DF1, each shifting program is assigned to several load dependent specific values, which serve to transfer the standard up-shifting characteristic curve HS45_st of the sport driving program "Sport" as shown in FIG. 7 into the up-shifting characteristic curve HS45.

That means that in the second version of the invention-related method, in an activated special function for an up-shift prevention contrary to the first version of the invention-related method for controlling a transmission that is based on FIG. 1 through FIG. 5, not the motor speed range, which is positioned above a shift-specific value, within which a requested shifting is prevented, is changed in relation to an actual operating condition of the vehicle. Rather, the shifting points of the transmission are changed for a sectional shift prevention through the operating range ∝ of the drive pedal depending on the actual operating condition of the vehicle in order to take into account the various factors and/or influences, such as current driver type, uphill, downhill, etc. and consider the actual control of the transmission.

Figure 9:
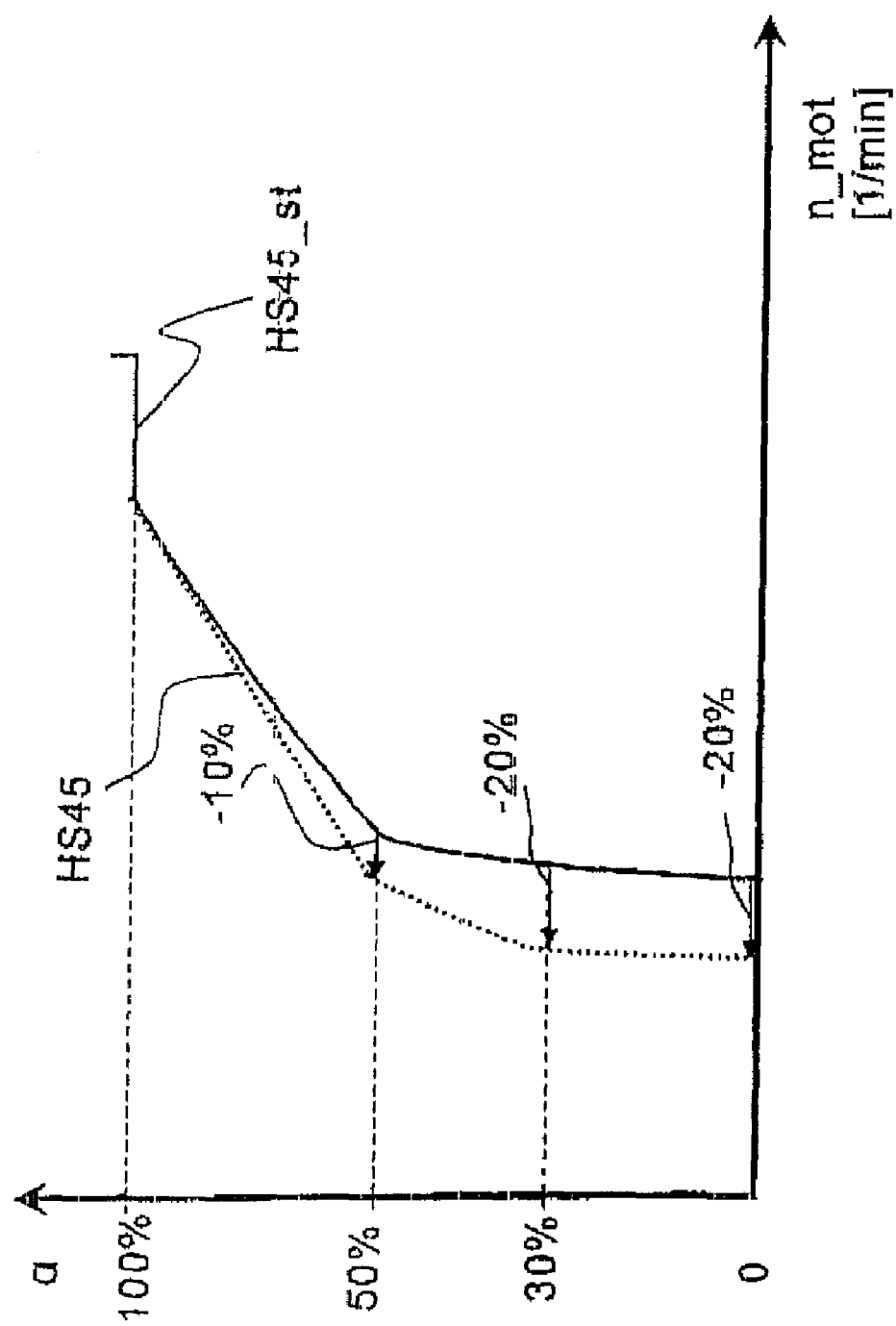
FIG. 9 an illustration of a down-shift characteristic curve of an economic shifting program with a condition dependent, dynamic shifting point variation that is equivalent to FIG. 7 and corresponds with FIG. 8.

FIG. 8 shows the data field DF1 of the special function "Curve Recognition KE", which is filled for each shifting program with several load dependent special values and is considered in the second version of the invention-related method for down-shifts in the transmission. FIG. 9 shows a standard down-shift characteristic curve RS43_st for a down-shifting from the fourth into the third forward gear, by means of which during non-activated special functions for a shift prevention a shift is requested, in connection with an altered shift characteristic curve RS43. The alteration of the standard down-shift characteristic curve RS43_st as shown in FIG. 9 is performed in consideration of the load dependent specific values assigned to the currently activated shifting program "Eco". That means that the standard down-shift characteristic curve RS43_st is altered during a drive pedal activation of α=0% in such a manner that a down-shifting takes place at a motor speed value, which is 20% below the motor speed, which is determined by the standard down-shift characteristic curve RS43_st.

Figure 10:
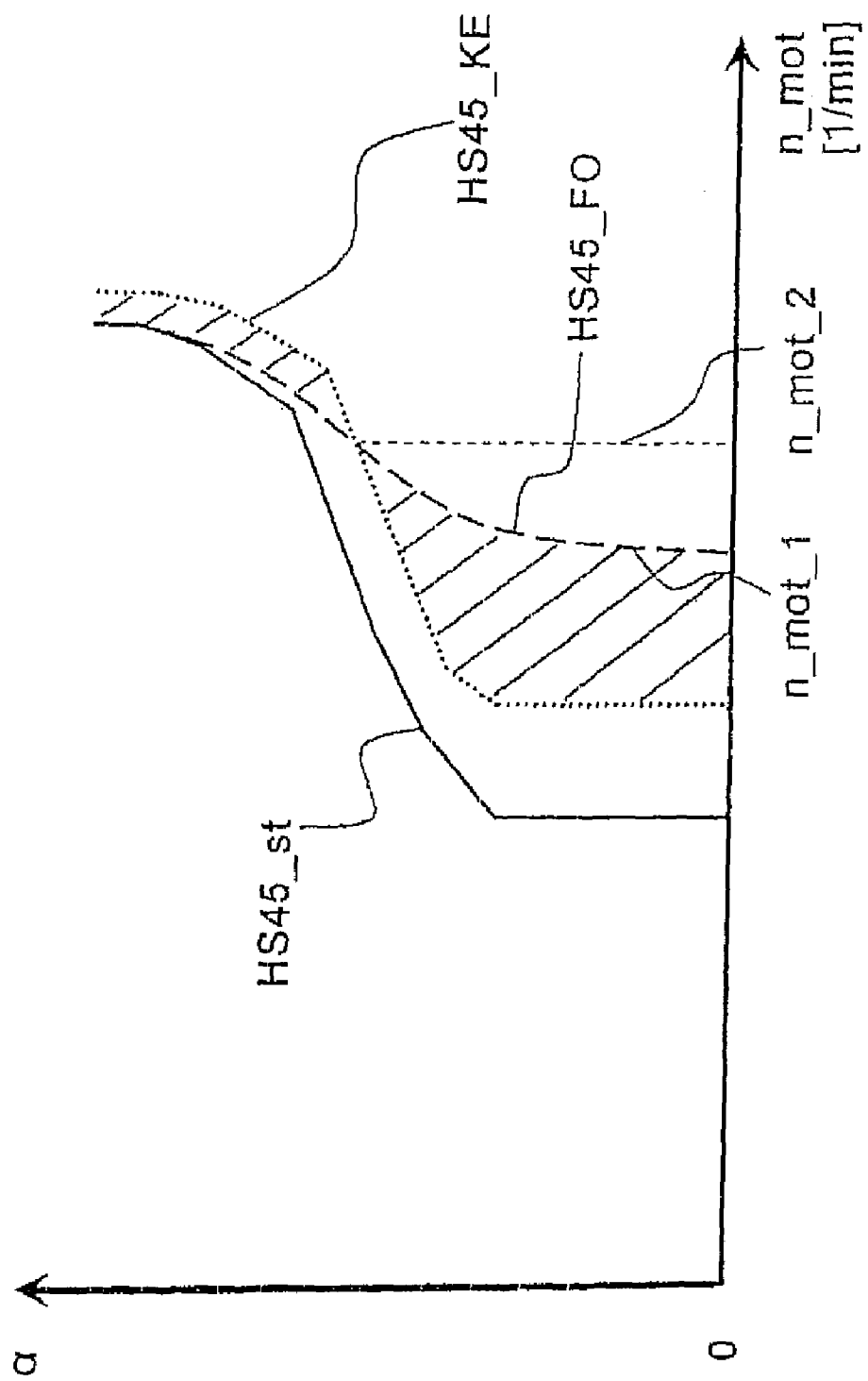
FIG. 10 a graphic illustration of a shifting point variation, which is performed by two simultaneously activated special functions for an anti-shifting device.

FIG. 10 shows the standard up-shift characteristic curve RS45_st in connection with a variation of the specific value during the activated sport driving program "Sport". Additionally, the simultaneously activated special functions "Curve Recognition KE" and "Rapid Drive Pedal Release FO" set off a change of the standard up-shift characteristic curve RS45_st toward the up-shift characteristic curve HS45_KE and HS_45FO. In this case, the procedure is the same as in the first version of the invention-related procedure according to FIG. 1 through FIG. 5, where a mathematical maximum or minimal selection is performed when several special functions are activated simultaneously.

In the present case, this means that from several varying shift characteristics always that shift characteristic is applied which requests an up-shifting to the respective highest motor speed value or a down-shifting to the respective lowest motor speed value. That means that the up-shifting from the fourth into the fifth forward gear at the motor speed range, which is limited by the first motor speed value n_mot_1 and the second motor speed value n_mot_2, is only performed when the up-shift characteristic curve HS45_SO is exceeded, which is adjusted by the specific value of the special function "Rapid Drive Pedal Release FO". In the additional motor speed range of the motor speed, that means above the second motor speed n_mot_2 the up-shifting from the fourth into the fifth forward gear is only performed when the up-shifting characteristic curve HS45_KE is exceeded, which is adjusted by the specific value of the special function "Curve Recognition KE".

Alternatively or in combination with the load dependent alteration of the upper motor speed limit or the lower motor speed limit of the motor speed range, wherein a down-shift preventing is performed, or the load dependent version of a shift characteristic, it is planned in a favorable development of the object of the invention to adjust the motor speed range and/or the shift characteristic in relation to the driving behavior of a specific driver in order to increase the driving comfort as well as the driving safety.

REFERENCE CHARACTERS

| | |
|---|---|
| DF1, DF2, DF3, DF4 | Data field |
| "0" | Shifting program |
| "Eco" | Economic shifting program |
| "Normal" | Normal shifting program |
| "Sport" | Sport shifting program |
| "Mountain II" | Mountain shifting program |
| "Warm-up" | Warm-up shifting program |
| "Tipp" | Shifting program for tip mode |
| n_mot | Motor speed |
| n_mot_max | Upper motor speed |
| n_mot_min | Lower motor speed |
| n_mot_max_st | Standard upper motor speed |
| "Curve Recognition KE" | Special function for shift prevention (KE) |
| "Rapid Drive Pedal Release FO" | Special function for shift prevention (FO) |
| "Spontaneous Delay Vehicle SVF" | Special function for shift prevention (SVF) |
| "Drive Speed Control FGR" | Special function for shift prevention (FGR) |
| "Drive Dynamic control ESP" | Special function for shift prevention (ESP) |
| Á | Activation range of the drive pedal |
| HS45 | Up-shift characteristic curve |
| HS45_st | Standard up-shift characteristic curve |
| RS45_st | Standard down-shift characteristic curve |
| RS43 | Down-shift characteristic curve |
| RS | Down-shift |
| HS | Up-shift |

The invention claimed is:

1. A method for controlling an automatic transmission of a motor vehicle where a gear ratio (1, 2, 3, 4, 5, 6) is shifted, according to operating conditions, by way of at least one pre-determined shifting program (0, Eco, Normal, Sport, Mountain II, Warm-up, Inching) and corresponding specific shifting characteristic curves (HS45, RS43) and where, in relation to an actual operating condition of the vehicle, at least one special function (Curve Recognition KE, Rapid Drive Pedal Release FO, Spontaneous Delay Vehicle SVF, Drive Speed Control FGR, Drive Dynamic Control ESP) is activated to prevent a shift from an actual gear ratio to a target gear ratio, as requested by the at least one pre-determined shifting program, within a pre-determined operating range of the vehicle, the method comprising the steps of:

preventing a gear ratio shift in the transmission depending on applied specific values, related to actual operating conditions of the vehicle, as represented by a range of a motor speed (n_mot) of a main engine of the vehicle between a lower motor speed (n_mot_min) and an upper motor speed (n_mot_max); and changing the range of the motor speed (n_mot) by multiplying the upper motor speed (n_mot_max) with at least one of the specific values that are dependent on the actual operating conditions of the vehicle.

2. The method according to claim 1, further comprising the step of changing the range of the motor speed (n_mot) by multiplying the lower motor speed (n_mot_min) with at least one of the specific values that are dependent on the operating conditions.

3. The method according to claim 1, further comprising the step of assigning each of the specific shifting characteristic curves to at least one specific value and at least one motor speed range such that the at least one special function ("Curve Recognition KE", "Rapid Drive Pedal Release FO", "Spontaneous Delay Vehicle SVF", "Drive Speed Control FGR", "Drive Dynamic Control ESP") prevents the gear ratio shift.

4. The method according to claim 1, further comprising the step of setting at least one of the upper motor speed (n_mot_max) and the lower motor speed (n_mot_min) to be constant through an operating range (∝) of a drive pedal.

5. The method according to claim 1, further comprising the step of setting at least one of the upper motor speed (n_mot_max) and the lower motor speed (n_mot_min) to be equal for different types of drivers.

6. The method according to claim 1, further comprising the step of changing at least one of the upper motor speed (n_mot_ max) and the lower motor speed (n_mot_min) based upon an operating range ($\propto$) of a drive pedal.

7. The method according to claim 1, further comprising the step of changing at least one of the upper motor speed (n_mot_ max) and the lower motor speed (n_mot_min) in relation to a driving behavior of a driver.

8. The method according to claim 1, further comprising the step of selecting the range of the motor speed (n_mot) with the highest upper motor speed (n_mot_max) for a shift prevention, when an up-shift (HS) is requested and several special functions (Curve Recognition KE, Rapid Drive Pedal Release FO, Spontaneous Delay Vehicle SVF) are simultaneously activated.

9. The method according to claim 1, further comprising the step of selecting the range of the motor speed (n_mot) with the lowest lower motor speed (n_mot_min) for a shift prevention, when a down-shift (RS) is requested and several special functions (Curve Recognition KE, Rapid Drive Pedal Release FO, Spontaneous Delay Vehicle SVF) are simultaneously activated.

10. The method according to claim 1, further comprising the step of providing specific values for up-shifts (HS) as well as for down-shifts (RS).

11. The method according to claim 1, further comprising the step of varying specific values by at least one of based upon an operating range ($\propto$) of a drive pedal and in relation to a driving behavior of a driver.

12. A method for controlling an automatic transmission of a motor vehicle where a gear ratio (1, 2, 3, 4, 5, 6) is shifted, according to operating conditions, by way of at least one pre-determined shifting program (0, Eco, Normal, Sport, Mountain II, Warm-up, Inching) and corresponding specific shifting characteristic curves (HS45, RS43) and where, in relation to a actual operating condition of a vehicle, at least one special function (Curve Recognition KE, Rapid Drive Pedal Release FO, Spontaneous Delay Vehicle SVF, Drive Speed Control FGR, Drive Dynamic Control ESP) is activated to prevent a shift from an actual gear ratio to a target gear ratio, as requested by the at least one pre-determined shifting program, within a pre-determined operating range of the vehicle, the method comprising the steps of:

adjusting operating points of the vehicle that are defined according to changing the shifting characteristic curves in relation to specific shifting values that are applied, depending on the operating conditions, such that operating points of the vehicle that are defined by the shifting characteristic curves, for which gear ratio shifts must be performed, being adjustable to the actual operating condition of the vehicle; and adjusting the shifting characteristic curves depending on the specific shifting values in relation to a motor speed (n_mot) of the vehicle engine.

13. The method according to claim 12, further comprising the step of changing gradients of the shifting characteristic curves based upon an operating range ($\propto$) of a drive pedal.

14. The method according to claim 12, further comprising the step changing gradients of the shifting characteristic curves in relation to a driving behavior of a driver.

15. The method according to claim 12, further comprising the step of simultaneously activating several selective special functions for a shift prevention that effects a greatest shifting point shift.

* * * * *